No. 723,091. PATENTED MAR. 17, 1903.
P. A. WEBB & G. A. HOWELL, Jr.
FILTER FOR COFFEE OR TEA POTS.
APPLICATION FILED SEPT. 3, 1902.
NO MODEL.
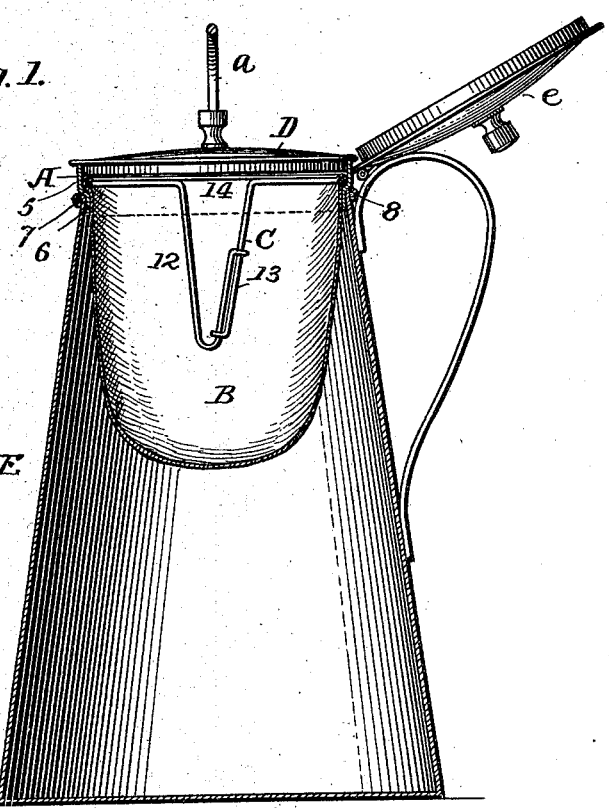
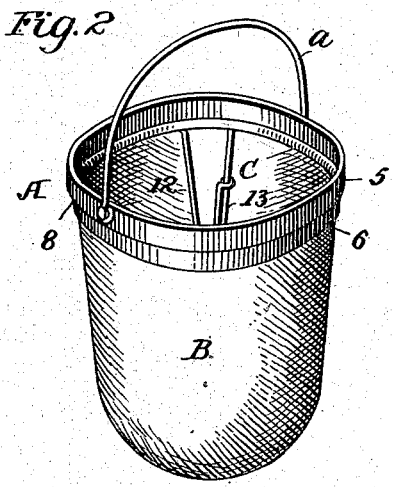
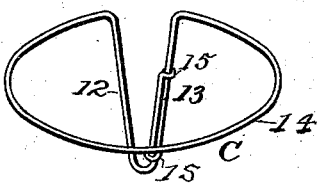

UNITED STATES PATENT OFFICE.

POWHATAN A. WEBB AND GEORGE A. HOWELL, JR., OF ATLANTA, GEORGIA.

FILTER FOR COFFEE OR TEA POTS.

SPECIFICATION forming part of Letters Patent No. 723,091, dated March 17, 1903.

Application filed September 3, 1902. Serial No. 121,974. (No model.)

*To all whom it may concern:*

Be it known that we, POWHATAN A. WEBB and GEORGE A. HOWELL, Jr., citizens of the United States, residing at Atlanta, in the county of Fulton and State of Georgia, have invented certain new and useful Improvements in Filters for Coffee or Tea Pots, of which the following is a specification.

This invention relates to filters for coffee or tea pots; and the object of the invention is to provide a simple, cheap, and efficient device of this character which may be readily applied to an ordinary coffee or tea pot and that may be easily removed and cleaned.

The invention will be fully described hereinafter, reference being had to the accompanying drawings, in which—

Figure 1 is a sectional elevation of an ordinary coffee or tea pot with our improved filter in position thereon. Fig. 2 is a perspective view of the filter detached. Fig. 3 is a perspective view of the spring-retainer detached.

The filter consists of the holder or support A, bag B, spring retaining device C for securing the bag to the holder, and a lid D.

The holder or support A is generally cylindrical in shape, its upper portion 5 being of greater diameter than its lower portion 6, whereby an interior annular shoulder 7 and an exterior annular shoulder 8 are formed. Preferably the holder or support A will be provided with a handle or bail $a$.

The spring-retainer C consists of a single piece of spring-wire having its end portions 12 and 13 bent at substantially right angles to the intervening portion 14 and the latter being bent to form an open contractible spring-ring with a space between the bent portions 12 and 13. The end portions are interlocked, and, as shown, the portion 12 is somewhat longer than the portion 13 and is bent upwardly to lie substantially parallel with the portion 13, and each end is bent to form a hook, as 15, the hook on the portion 12 embracing the portion 13 and that on the portion 13 embracing the portion 12.

In assembling the parts the upper end of the bag B is inserted within the holder or support A, and the spring-retainer C is contracted and inserted in the mouth of the bag and then released, when it will expand and clamp the bag between it and the inner surface of the portion 5 of the holder A and will itself be supported upon the shoulder 7, and the bag will thus be firmly secured to the holder.

E indicates an ordinary coffee or tea pot having the usual lid $e$, which may either be hinged to the pot or be entirely removable therefrom.

In using the filter the lid $e$ will be opened or removed, as the case may be, and the filter inserted into the pot, with the shoulder 8 of the support A resting upon the upper edge of the pot. The ground coffee or the tea will next be put into the bag and the necessary quantity of water poured over it, and then the lid D will be put on the holder to close it. When the decoction is ready for use, the entire filter, with the coffee-grounds or tea-leaves, as the case may be, will be lifted out of the pot, the handle $a$ forming a convenient means to accomplish this, and the pot may then be closed with its lid $e$. By compressing the spring-retainer the bag and retainer may be separated from the holder or support and the retainer from the bag, and all the parts may then be easily cleaned.

In some instances we use the spring-retainer and bag, independently of the other portions shown, in connection with a pot or other receptacle.

Without limiting ourselves to the precise details of construction illustrated and described, we claim—

1. A filter for coffee or tea pots consisting of a cylindrical holder or support, the upper portion of which is of greater diameter than the lower portion to form interior and exterior annular shoulders between its ends, a bag the mouth of which fits within the holder, an open, contractible spring-ring retainer to fit within the mouth of the bag and clamp the latter to the holder, the interior annular shoulder of the holder forming a support for the said retainer, and the exterior annular shoulder being adapted to rest upon the upper edge of a pot and support the filtering-bag within the pot, substantially as set forth.

2. A filter for coffee or tea pots consisting of a cylindrical holder or support the upper portion of which is of greater diameter than the lower to form interior and exterior annular shoulders between its ends, a bail or handle on said holder or support, a detachable lid for the support, a bag the mouth of which fits within the holder, an open contractible spring-ring retainer to fit within the mouth of the bag and clamp the latter to the holder, the interior annular shoulder of the holder forming a support for the said retainer, and the exterior annular shoulder being adapted to rest upon the upper edge of a pot and support the filtering-bag within the pot, substantially as set forth.

3. A filter for coffee or tea pots consisting of a bag and a spring-retainer fitting within the mouth of the bag, the retainer comprising a single piece of spring metal having its end portions bent downwardly at substantially right angles to the intervening portion, and one of the bent portions being longer than the other and bent upwardly to overlap the latter, and overlapping portions being interlocked, substantially as set forth.

In testimony whereof we have signed our names to this specification in the presence of two subscribing witnesses.

POWHATAN A. WEBB.
GEORGE A. HOWELL, JR.

Witnesses:
JNO. R. THORNTON,
DAN MOSS.